United States Patent [19]

Griffin

[11] Patent Number: 4,790,475
[45] Date of Patent: Dec. 13, 1988

[54] REUSABLE STATIONERY CARRIER

[76] Inventor: Michael L. Griffin, 1147 E. 12th St., Tucson, Ariz. 85719

[21] Appl. No.: 397,358

[22] Filed: Jul. 12, 1982

[51] Int. Cl.⁴ ............................................. B65D 27/10
[52] U.S. Cl. ................................ 229/69; 101/407 R; 206/820; 400/522
[58] Field of Search ............................ 229/73, 69, 72; 282/11.5 A; 206/820; 40/159, 160, 154, 124.2, 537, 405; 101/407 R, 269; 400/522, 525, 531

[56] References Cited

U.S. PATENT DOCUMENTS

| | | | |
|---|---|---|---|
| 2,034,730 | 3/1936 | Palley | 400/522 |
| 3,312,385 | 4/1967 | Amort | 229/73 |
| 3,820,447 | 6/1974 | Gendron et al. | 229/73 |
| 4,077,323 | 3/1978 | Liuzzo | 101/407 R |
| 4,214,388 | 7/1980 | Dickey | 40/159 |
| 4,239,114 | 12/1980 | Denay | 229/69 |

Primary Examiner—Jimmy G. Foster
Assistant Examiner—Bryon Gehman
Attorney, Agent, or Firm—Victor Flores

[57] ABSTRACT

The continuous stationery carrier which is adapted to be fed through computer printers, word processing printers, and the like so as to permit the stationery carried therein to be printed upon comprises a plurality of polyethylene backing sheets sequentially joined together along perforated fold lines and equipped with a plurality of feed apertures along the right and left margins thereof. Each backing sheet has a polyethylene cover sheet joined thereto in pocket forming relationship therewith so as to be capable of retaining a piece of stationery. Each cover sheet is provided with at least one aperture therein through which the stationery may be printed upon. The shape and the size of the cover sheets and the apertures therein may be selected to suit a particular application.

10 Claims, 1 Drawing Sheet

REUSABLE STATIONERY CARRIER

BACKGROUND OF THE INVENTION

This invention relates generally to a stationery carrier and, more particularly, to a reusable stationery or envelope carrier for use in conjunction with computer printers, word processing printers, and the like.

Many different types of continuous stationery assemblies are known and manufactured for use in conjunction with high speed printers. Most of the known assemblies utilize stationery or envelopes which are attached to a carrier from which they are removed after printing. For example, U.S. Pat. Nos. 2,824,686; 3,758,025; and 4,066,206 describe continuous envelope assemblies wherein a plurality of envelopes are secured to a continuous backing sheet. Furthermore, U.S. Pat. No. 3,804,226 describes an assembly wherein a plurality of cards are adhesively fixed to a continuous carrier sheet. In some arrangements, such as those described in U.S. Pat. Nos. 3,312,385 and 3,869,080, the carriers include cutout portions through which printing may take place. In U.S. Pat. No. 4,123,086, a continuous stationery assembly is disclosed wherein a continuous locating web is folded along opposite margins to define longitudinal flaps which form pockets for retaining stationery. The arrangement relies, however, on the use of the adhesives to retain the stationery in proper position.

Other known assemblies take the form of multiple-ply assemblies joined by adhesives to create packets which are then printed upon, separated, and mailed.

All of the above-described mode assemblies are constructed from paper and are intended for one-time use only, which increases the printing rate when printing data from computer stores or data banks on large volumes of material. Unfortunately, the cost involved in manufacturing such assemblies are high and such manufacturing requires special equipment which may not be readily available. Thus, such assemblies may not be available to, for example, the small businesses.

SUMMARY OF THE INVENTION

It is an object of the present invention to provide a stationery carrier or web which can be used to carry ordinary office or personal letterhead and envelopes which are to be printed on by word processing systems or other high speed printers.

It is a further object of the present invention to provide a stationery carrier which is constructed on the material having sufficient strength so as to render the carrier reusable.

It is a still further object of the present invention to provide a stationery carrier which is economical to manufacture and simple to use.

According to a broad aspect of the invention there is provided a continuous stationery carrier adapted to be fed through computer printers, word processing printers, and the like, so as to permit stationery carried thereby to be printed upon, comprising a plurality of backing sheets sequentially joined together and provided with a plurality of feed apertures along the right and left margins thereof; and a plurality of cover sheets, each one joined to one of said plurality of backing sheets, to form a pocket therewith into which said stationery paper may be inserted. Each of said plurality of cover sheets is equipped with at least one aperture through which said stationery may be printed upon.

The above, and other objects features and advantages of the present invention will be more clearly understood from the following detailed description taken in conjunction with the accompanying drawings, in which:

DESCRIPTION OF THE PREFERRED EMBODIMENT

Figure 1:
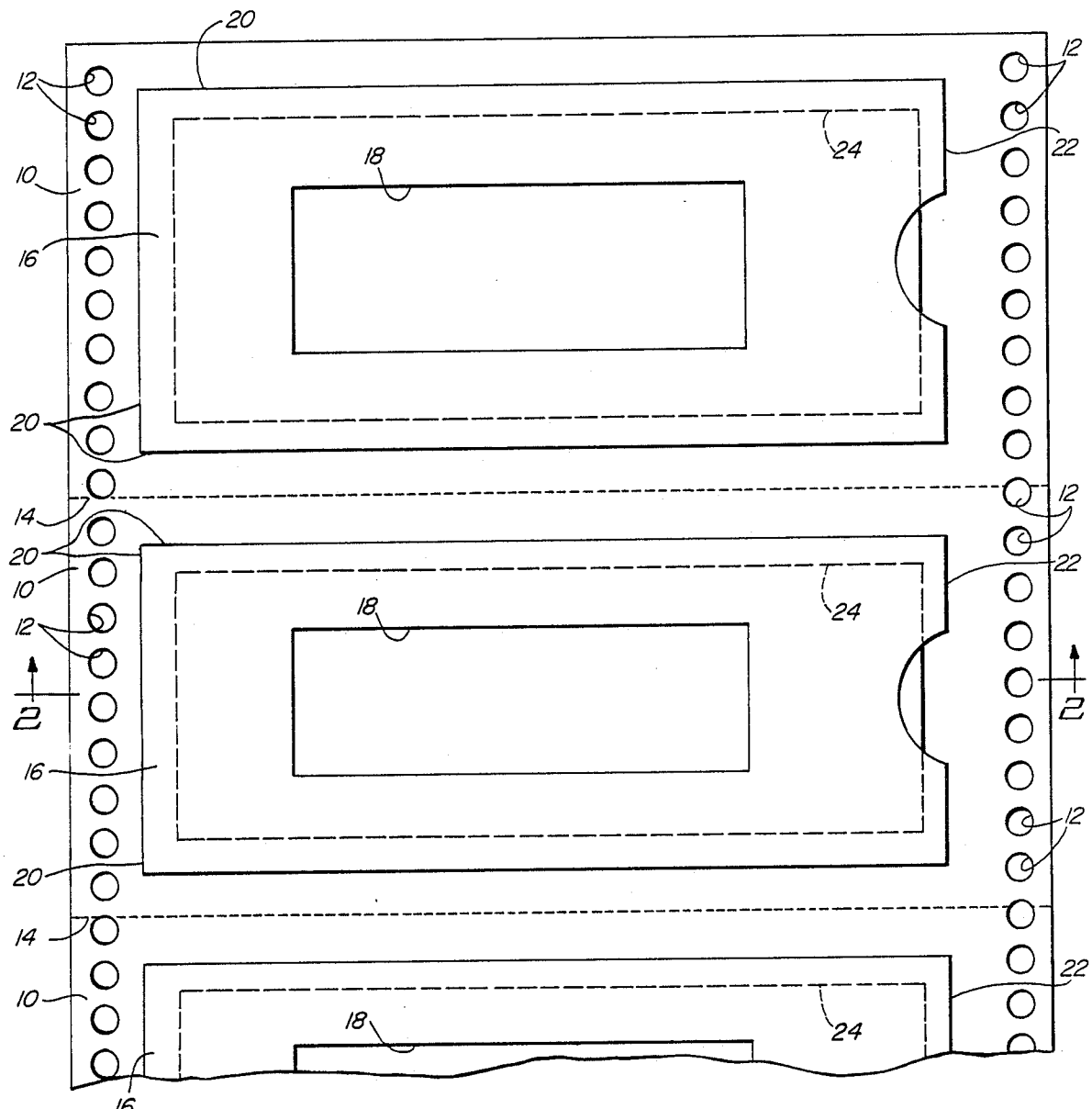
FIG. 1 is an upper plan view of the inventive stationery carrier.
Figure 2:
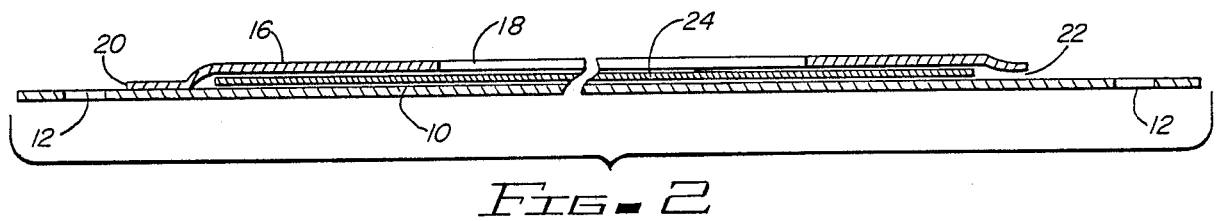
FIG. 2 is a cross sectional view of the assembly shown in FIG. 1 taken along line 2—2 thereof.

The carrier or web shown in FIGS. 1 and 2 can hold ordinary office or personal letterhead stationery or envelopes while each of such letterhead or envelopes is sequentially printed upon by a word processing system or a high speed computer printer. The carrier comprises a backing sheet 10 made of a material which offers the required strength and durability for repeated use. For example, the carrier may be constructed of a high density polyethylene material which, in appearance, is very similar to paper, but which has the durability and strength of a plastic fiber. Such a material is known as Tyvek spunbonded olefin manufactured by and available from E. I. DuPont de Nemours and Company, Wilmington, Del. A plurality of regularly spaced feed apertures 12 are provided along the left and right margins of the backing sheet to permit the carrier to feed through high speed computer printers or word processing printer units. Partial transverse perforations 14 are provided between each unit of the continuous web to facilitate folding of the entire carrier series without risk of detaching the individual sheets.

Each unit in the continuous web assembly comprises a backing sheet 10, and a cover sheet 16 having an aperture 18 provided therein. Cover sheet 16 may be made of the same material as backing sheet 10, and the aperture may be of any desired shape and dimension. Cover sheet 16 is joined to backing sheet 10 at contact regions 20 corresponding to the upper, lower and left sides of the cover sheet. This may be accomplished by heat sealing or through the use of commercially available adhesives. The fourth or right side of the cover sheet 22 is left unsealed creating a pocket into which conventional stationery such as notes, memos, letters or envelopes may be inserted. Such conventional stationery within each of the pockets is indicated by numeral 24. It should be clear that the pockets may accomodate letters or sheets of paper depending on the size of the cover sheet on the backing sheet. The continuous web may be loaded manually and then utilized on word processing or computer equipment which prints on the inserted stationery through the aperture 18 in the cover sheet. Once printed upon, the stationery may be removed from the pockets and the carrier reloaded for reuse.

The above description is given by way of example only. Changes in form and details may be made by one skilled in the art without departing from the spirit and scope of the invention. For example, while aperture 18 in cover sheet 16 is shown as being rectangular, the shape and size of the aperture may be altered to suit a particular application. Furthermore, more than one aperture in the cover sheet may be utilized. Still further, while FIGS. 1 and 2 illustrate a carrier wherein the pockets are formed by sealing the top, bottom and left sides of each cover sheet to the backing sheet, the unsealed side could be chosen to be any one of the four sides so long as a pocket is formed capable of retaining the inserted stationery.

What is claimed is:

1. A continuous stationery carrier adapted to be fed through computer printers, word processing printers, and the like, so as to permit stationery carried thereby to be printed upon, comprising:

a plurality of backing sheets sequentially joined together and provided with a plurality of feed apertures along the right and left margins thereof, each of said backing sheets adjacent to each other being joined together by a common fold line of partial perforations in order to permit folding of a continuous strip of a plurality of carriers without tearing said strip, said backing sheets including a relatively strong durable plastic fiber material; and a plurality of cover sheets each one joined to one of said plurality of backing sheets to form a pocket therewith into which said stationery may be inserted, each of said plurality of cover sheets being equipped with at least one aperture through which said stationery may be printed upon followed by the removal of said stationery after printing thereon from the pocket formed in said carrier so that said carrier can be reused, said cover sheets including a relatively strong durable plastic fiber material.

2. The continuous stationery carrier of claim 1 wherein each of said backing sheets is constructed from a polyethylene plastic material.

3. The continuous stationery carrier of claim 2 wherein each of said cover sheets is constructed from a polyethylene plastic material.

4. The continuous stationery carrier of claim 3 wherein said cover sheets includes a polyethylene plastic material such as spun-bonded olefin polyethylene plastic material.

5. The continuous stationery carrier of claim 2 wherein said backing sheets includes a polyethylene plastic material such as spun-bonded olefin polyethylene plastic material.

6. The continuous stationery carrier of claim 1 wherein said cover sheets are adhesively joined to said backing sheets.

7. The continuous stationery carrier according to claim 1 wherein said cover sheets are sealed to said backing sheets.

8. The continuous stationery carrier of claim 7 wherein each of said cover sheets in rectangular in shape and joined along three edges thereof to said backing sheet to form a carrier pocket for the insertion of a sheet of stationery therein for printing thereon through said printing aperture.

9. The continuous stationery carrier of claim 7 wherein the upper, lower and left edges of each cover sheet are adhesively joined to the corresponding upper, lower and left edges of each backing sheet.

10. A reuseable stationery carrier adapted to be fed through computer printers, word processing printers, high speed printers, and the like so as to permit stationery carried thereby to be printed upon, comprising:

a polyethylene plastic backing sheet having a plurality of feed apertures therein along the right and left margins thereof; and a polyethylene plastic cover sheet joined to said backing sheet so as to form a pocket therein into which said stationery may be inserted after the manufacturing of said carrier is completed, said cover sheet being equipped with at least one printing aperture through which said stationery may be printed upon followed by the removal of the stationery having been printed thereon from the pocket formed in said carrier for multiple repeated use of said carrier.

* * * * *